US010023392B2

United States Patent
Peng

(10) Patent No.: US 10,023,392 B2
(45) Date of Patent: Jul. 17, 2018

(54) BELT DRIVEN LINEAR ACTUATOR

(71) Applicant: HIWIN TECHNOLOGIES CORP., Taichung (TW)

(72) Inventor: Tsung-Wen Peng, Taichung (TW)

(73) Assignee: HIWIN TECHNOLOGIES CORP., Taichung (TW)

( * ) Notice: Subject to any disclaimer, the term of this patent is extended or adjusted under 35 U.S.C. 154(b) by 408 days.

(21) Appl. No.: 15/041,037

(22) Filed: Feb. 11, 2016

(65) Prior Publication Data
US 2017/0233192 A1 Aug. 17, 2017

(51) Int. Cl.
*B65G 25/06* (2006.01)

(52) U.S. Cl.
CPC .......... *B65G 25/06* (2013.01); *B65G 2207/30* (2013.01)

(58) Field of Classification Search
CPC . B65G 25/06; B65G 2207/30; F16H 19/0645; F16H 2019/0686
See application file for complete search history.

(56) References Cited

U.S. PATENT DOCUMENTS

| 7,922,613 | B2 * | 4/2011 | Lida | F16H 19/06 |
| | | | | 384/26 |
| 9,869,348 | B2 * | 1/2018 | Baric | F16C 29/123 |
| 2005/0054468 | A1 * | 3/2005 | Nagai | F16C 29/063 |
| | | | | 474/148 |
| 2005/0061092 | A1 * | 3/2005 | Meier | B25J 9/026 |
| | | | | 74/89.22 |

* cited by examiner

*Primary Examiner* — Terence Boes
(74) *Attorney, Agent, or Firm* — Bruce Stone LLP; Joseph Bruce

(57) ABSTRACT

A belt driven linear actuator includes: a base, a linearly movable unit, a belt driven unit, a first cover, a second cover, a drive source, and a slide block. With the first and second covers removably disposed on the base, the first and second covers can be located at different positions to define different gaps in different directions, so as to allow the slide block to be assembled in different directions, and reduce the restriction on the assembling direction of the drive source. Besides, the width of the base is equal to the height of the base, and the height of the cover portion is equal to the height and the width of the base, which allows the base to be assembled in the same position while in different directions.

6 Claims, 10 Drawing Sheets

BELT DRIVEN LINEAR ACTUATOR

BACKGROUND

Field of the Invention

The present invention relates to a linear actuator, and more particularly to a belt driven linear actuator.

Related Prior Art

Linear guideways have been widely used as a medium for linear motion transmission due to the advantages of high precision, good load capacity, high speed transmission, and being easy to assemble.

The linear guideways generally include ball screw driven linear guideway and belt driven linear guideway. As shown in FIG. 1, a belt driven linear guideway A comprises: a base A1, a rail A2, a slide block A3 slidably mounted on the rail A2, and a belt A4 disposed on the slide block A3. The cycling motion of the belt A4 causes repeated back and forth displacement of the slide block A3 along the rail A2.

The base A1 is a U-shaped structure with a gap A11. A cover A5 covers the gap A11 and fixed to the belt A4, so that the cover A5 moves along with the slide block A3, and some components that need to be driven by the belt A4 can be disposed on the cover A5. Due to the configuration of the base A1, the directions in which the cover A5 and the belt A4 are assembled are limited. For example, the base A1 is only provided with a single gap A11 in a single direction, therefore, the cover A5 has to be disposed at the position of the gap A11, and the assembling direction of the belt A4 is also limited. As a result, the direction of the motor M which rotates the belt A4 is also restricted. As shown in FIG. 1, the motor M can just be disposed at left or right side of the base A1. Due to the restriction of the assembling direction of the respective components, the whole device is also restricted in terms of application and installation space.

The present invention has arisen to mitigate and/or obviate the afore-described disadvantages.

SUMMARY

The present invention is aimed at providing a belt driven linear actuator, which is capable of reducing the restriction on the assembling direction of the drive source.

Therefore, a belt driven linear actuator provided by the preset invention comprises:

a base with a first assembling portion and a second assembling portion which are connected to each other, wherein a direction connected between two ends of the base is defined as a length direction, the first assembling portion extends at least in the length direction and a width direction, the second assembling portion extends at least in the length direction and a height direction, the width direction is perpendicular to the length direction, the length direction is perpendicular to the width direction and the height direction, the base has a width in the width direction and a height in the height direction, the width is equal to the height, an end surface of the first assembling portion which is not connected to the second assembling portion is defined as a first connecting end surface, and an end surface of the second assembling portion which is not connected to the first assembling portion is defined as a second connecting end surface;

a linearly movable unit fixed between the first and second assembling portions, and including a guide member and a linearly movable member linearly movable along the guide member;

a belt drive unit driving the linearly movable member to move linearly;

a first cover being a flat plate removably disposed on the base;

a second cover being an L-shaped flat plate, wherein the first cover and the second cover are removably disposed on the first and second connecting end surfaces, respectively, the second cover including a cover portion and an assistant portion which are connected to each other, wherein the cover portion has a height which is measured from one end of the cover portion connected to the assistant portion to another opposite end of the cover portion, the height of the cover portion is equal to the width and height of the base, the cover portion is connected to the base, when the second cover is connected to the base, the assistant portion defines a gap with respect to the first cover;

a drive source serving to rotate the belt driven unit; and a slide block being inserted in the gap and moved along with the linearly movable member.

In summary, with the first and second covers removably disposed on the L-shaped base, plus the size restrictions on the abovementioned components, the first and second covers can be located at different positions to define different gaps P in different directions, so as to allow the slide block to be assembled in different directions, and reduce the restriction on the assembling direction of the drive source. Besides, the width of the base is equal to the height of the base, and the height of the cover portion is equal to the height and the width of the base, which allows the base to be assembled in the same position while in different directions, and thus the freedom in assembling positions and the applicability of the whole device of the present invention is enhanced.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1:
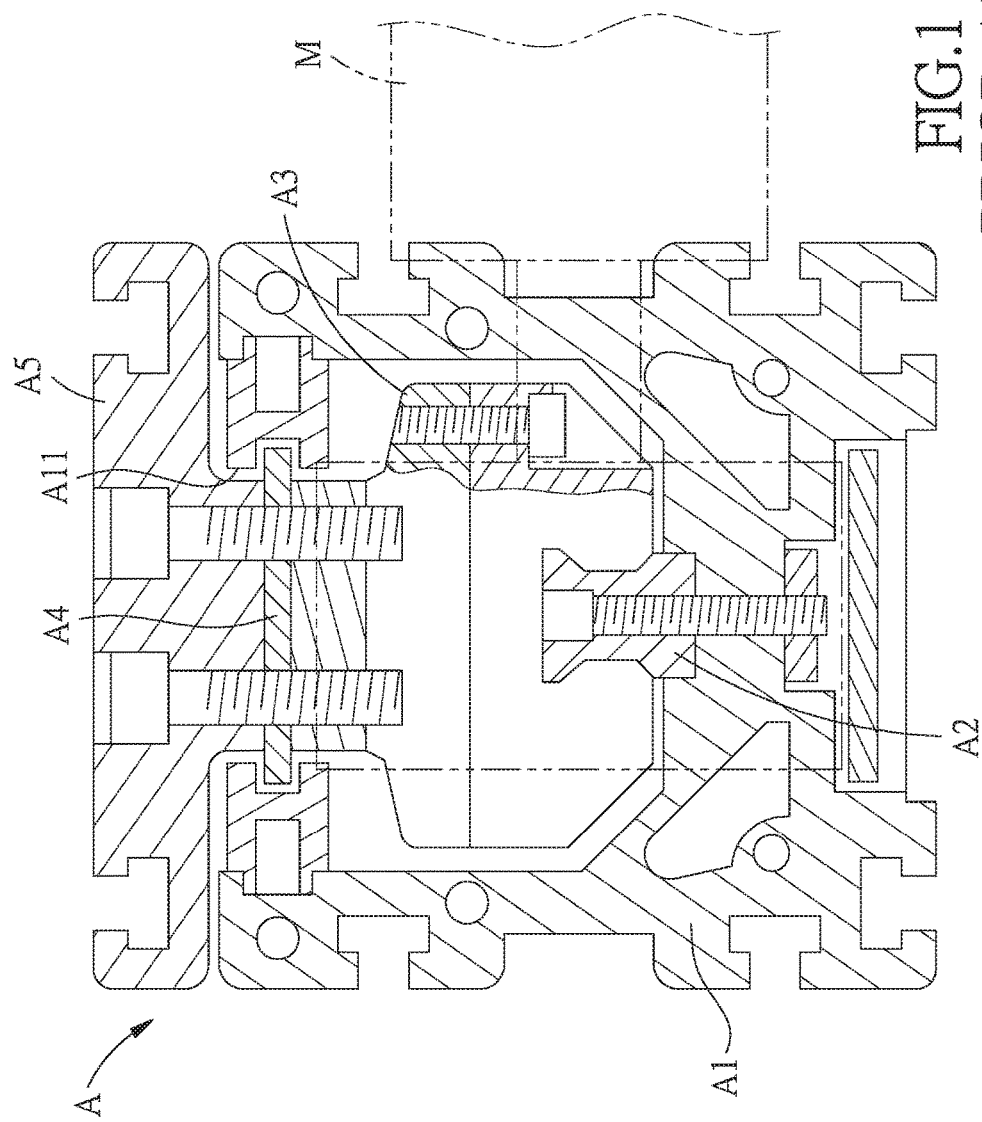
FIG. 1 is a cross sectional view of a conventional belt driven linear actuator.
Figure 2:
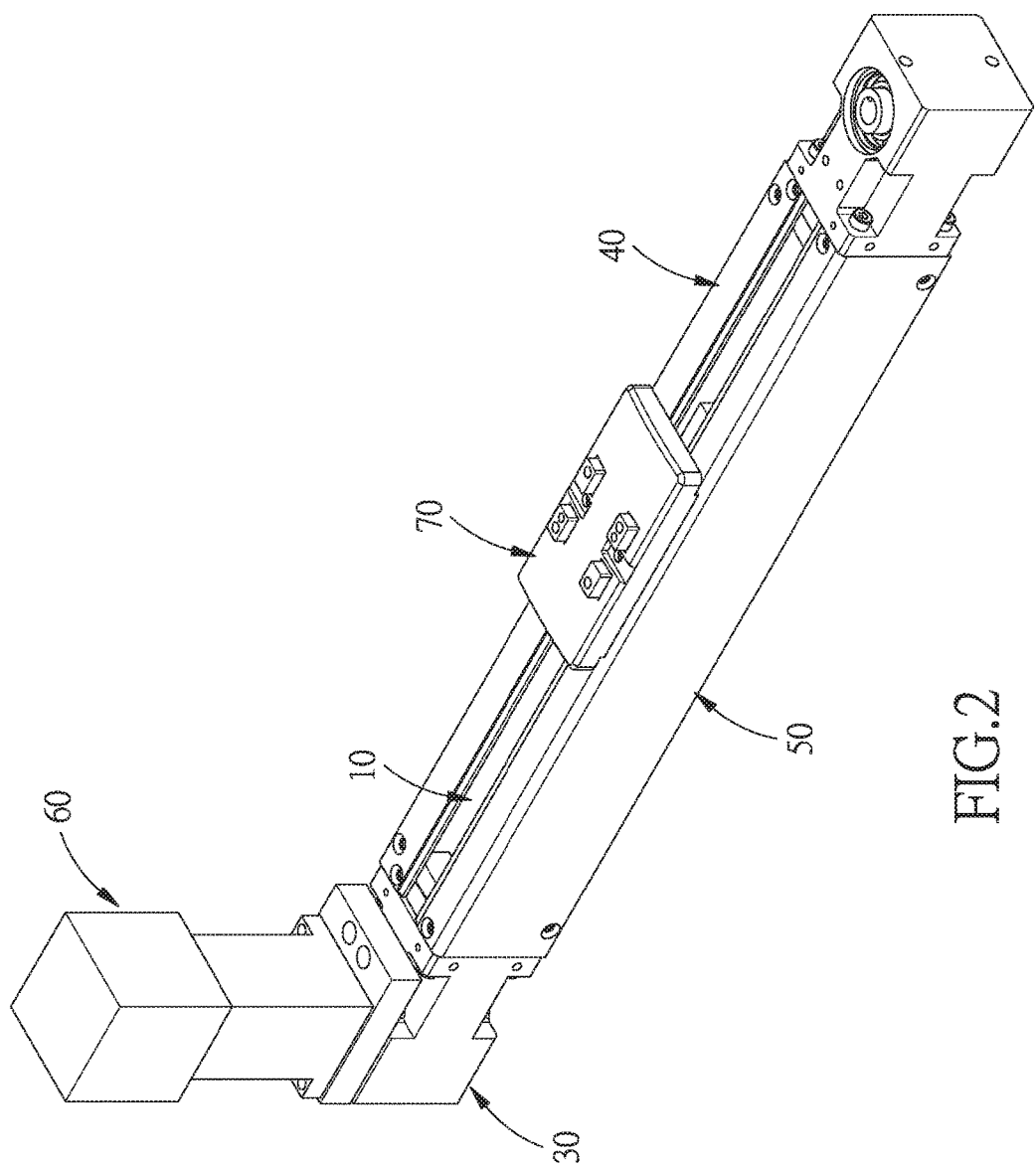
FIG. 2 is a perspective view of a belt driven linear actuator in accordance with a preferred embodiment of the present invention.

The present invention will be clearer from the following description when viewed together with the accompanying drawings, which show, for purpose of illustrations only, the preferred embodiment in accordance with the present invention.

Referring to FIGS. 2-5, a belt driven linear actuator in accordance with a preferred embodiment of the present invention comprises: a base 10, a linearly movable unit 20, a belt driven unit 30, a first cover 40, a second cover 50, a drive source 60, and a slide block 70.

A direction connected between two ends of the base 10 is defined as a length direction L. The base 10 is an L-shaped structure with a first assembling portion 11 and a second assembling portion 12 which are connected to each other. Each of the first assembling portion 11 and the second assembling portion 12 is a sheet structure. The first assembling portion 11 extends at least in the length direction L and a width direction W. The second assembling portion 12 extends at least in the length direction L and a height direction H. The width direction W is perpendicular to the length direction L, and the length direction L is perpendicular to the width direction W and the height direction H. The base 10 has a width W10 in the width direction W and a height H10 in the height direction H, and W10 is equal to H10.

An end surface of the first assembling portion 11 which is not connected to the second assembling portion 12 is defined as a first connecting end surface 111, and an end surface of the second assembling portion 12 which is not connected to the first assembling portion 11 is defined as a second connecting end surface 121.

The linearly movable unit 20 is fixed between the first and second assembling portions 11, 12. Namely, the linear movable unit 20 can be selectively fixed on the first or second assembling portion 11, 12. The linearly movable unit 20 includes a guide member 21 and a linearly movable member 22 linearly movable along the guide member 21.

The belt drive unit 30 includes a belt 31, an assembling seat 32 and two pulley seats 33. The assembling seat 32 is fixed to the linearly movable member 22 of the linearly movable unit 20. Each of the two pulley seats 33 includes an assembling hole 331 running through both ends thereof, and a pulley 332 rotatably disposed in the assembling hole 331.

The two pulleys 332 at located at two ends of the base 10. The belt 31 is fixed to the assembling seat 32 and wound around the pulleys 332 of the two pulley seats 33.

The first cover 40 is a flat plate removably disposed on the base 10.

The second cover 50 is an L-shaped flat plate. The first and second covers 40, 50 are removably disposed on the first and second connecting end surfaces 111, 121, respectively. Namely, when the first cover 40 is disposed on the first connecting surface 111, the second cover 50 is disposed on the second connecting end surface 121, and vice versa. The second cover 50 includes a cover portion 51 and an assistant portion 52 which are connected to each other. The cover portion 51 has a height Si which is measured from one end of the cover portion 51 connected to the assistant portion 52 to another opposite end of the cover portion 51, and S1=W10=H10. The assistant portion 52 has a height S2 which is measured from one end of the assistant portion 52 connected to the cover portion 51 to another opposite end of the assistant portion 52, and S2<S1. The cover portion 51 is connected to the base 10. When the second cover 50 is connected to the base 10, the assistant portion 52 defines a gap P with respect to the first cover 40.

The drive source 60 is engaged with one of the pulleys 332 to rotate the belt driven unit 30.

The slide block 70 has a connecting portion 71 inserted in the gap P and fixed to the assembling seat 32 of the belt driven unit 30 to move along with the linearly movable member 22. The slide block 70 is provided for carrying devices to be driven to move. It is to be noted that the slide block 70 can be disposed on an arbitrary surface of the assembling seat 32.

Figure 3:
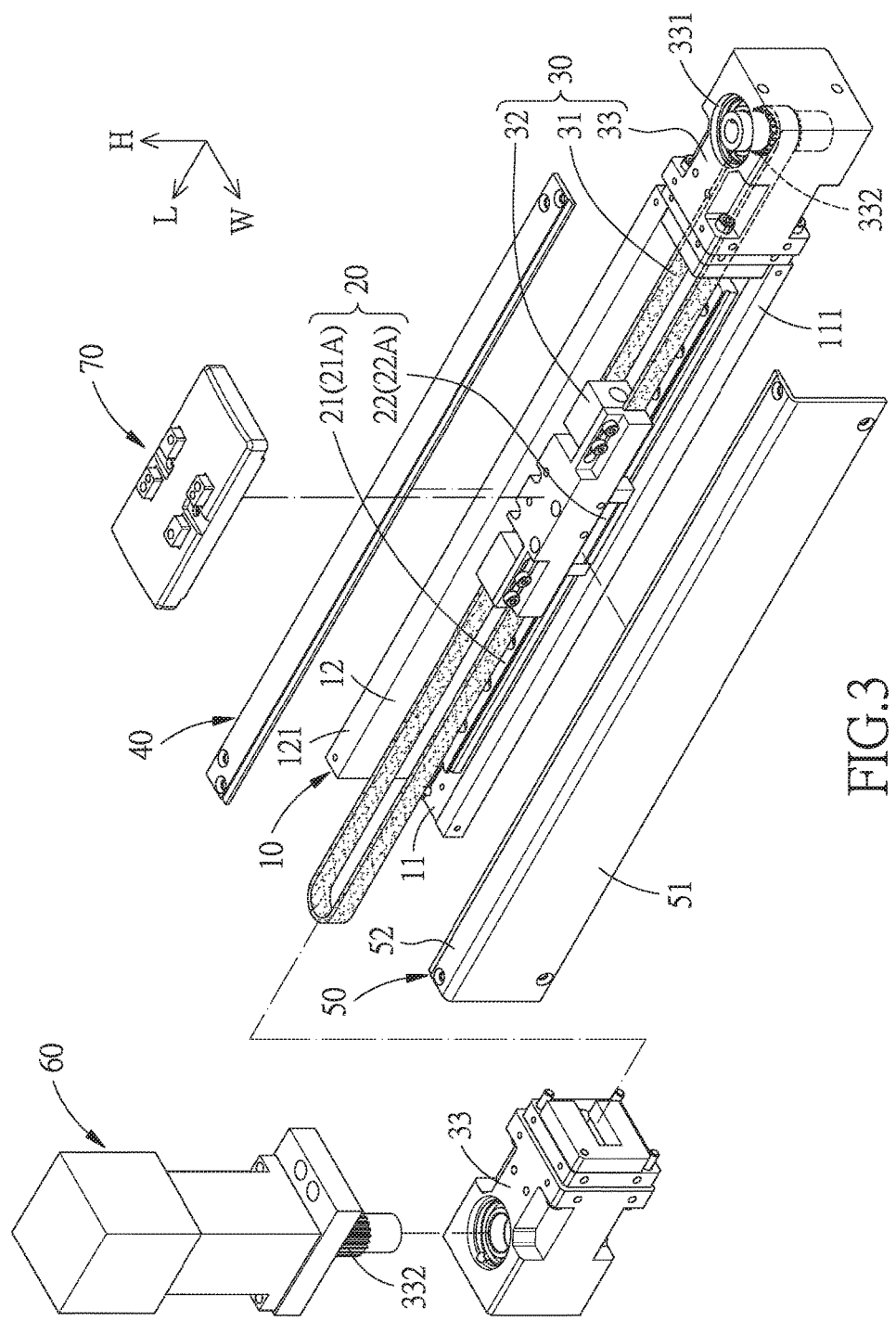
FIG. 3 is an exploded view of the belt driven linear actuator in accordance with the preferred embodiment of the present invention.

The guide member 21 and the linearly movable member 22 of the linearly movable unit 20 are not restricted by form or shape. For example, the guide member 21 and the linearly movable member 22 of the linearly movable unit 20 as shown in FIG. 3, can be a guide member 21A in the form of a rail, and a linearly movable member 22A in the form of a slide block. The linearly movable member 22A is linearly movable along the guide member 21A.

Figure 14:
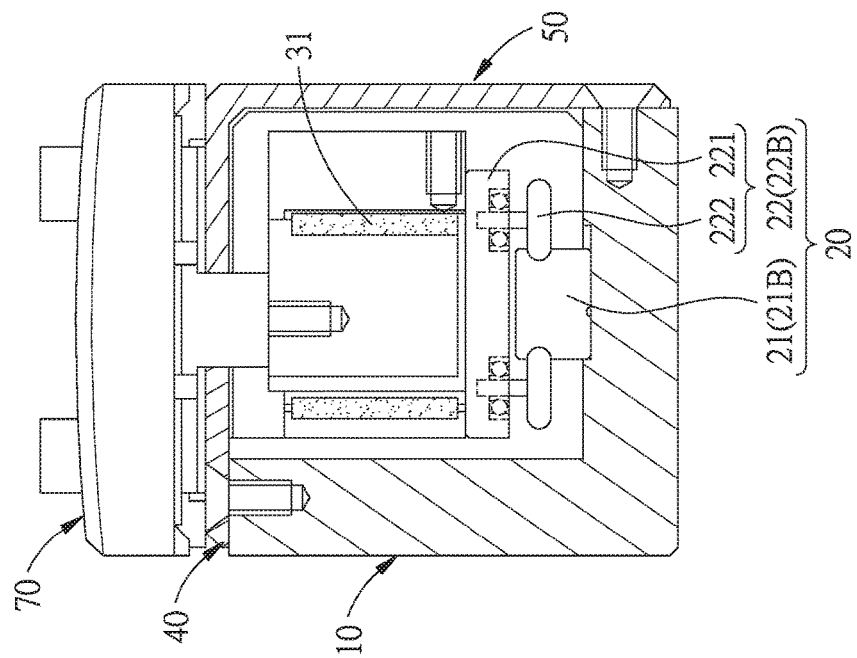
FIG. 14 shows another embodiment of the linearly movable unit of the belt driven linear actuator in accordance with the present invention.

As shown in FIG. 14, the guide member 21 and the linearly movable member 22 of the linearly movable unit 20 can also be a guide member 21B in the form of a rail, and a linearly movable member 22B in the form of a roller seat which includes a seat body 221 and a plurality of rollers 222. The rollers 222 are rotatably clamped against two lateral sides of the seat body 221, so that the linearly movable member 22B is linearly movable along the guide member 21B.

Figure 15:
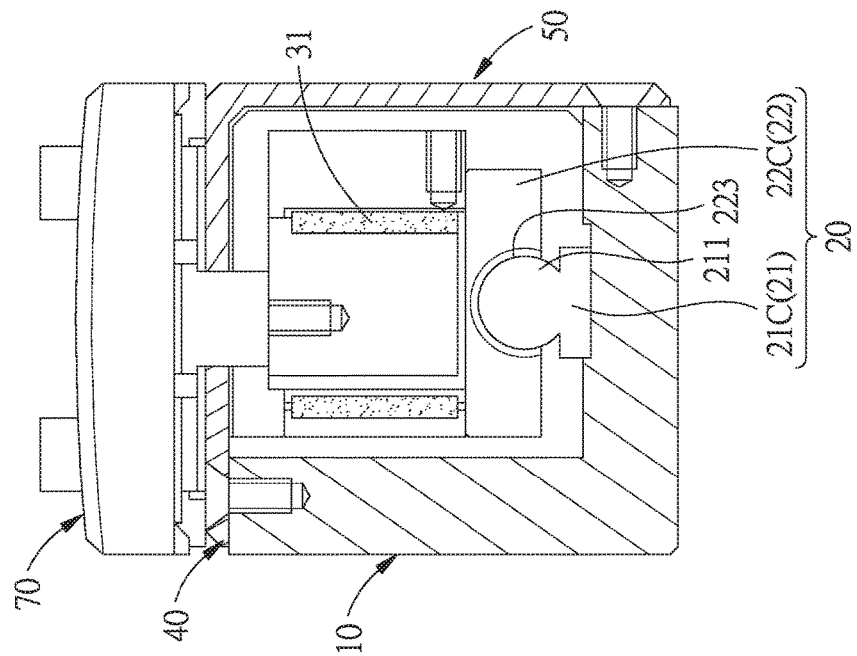
FIG. 15 shows another embodiment of the linearly movable unit of the belt driven linear actuator in accordance with the present invention.

As shown in FIG. 15, the guide member 21 and the linearly movable member 22 of the linearly movable unit 20 can also be a guide member 21C in the form of a rail with a spherical cross section 211, and a linearly movable member 22C in the form of a slide block which includes a spherical engaging portion 223. The spherical guide member 21C is movable inserted in the linearly movable member 22C, so that the linearly movable member 22C is linearly movable along the guide member 21C.

The drive source 60 rotates one of the pulleys 332, and the rotation of this pulley 332 causes the rotation of the belt 31 and another one of the pulleys 332. In this way, the belt 31 can drive the assembling seat 32 to move, the assembling seat 32 drives the linearly movable member 22 to move linearly along the guide member 21. Meanwhile, the slide block 70 on the assembling seat 32 is also caused to move linearly while carrying the devices mounted thereon.

Figure 4:
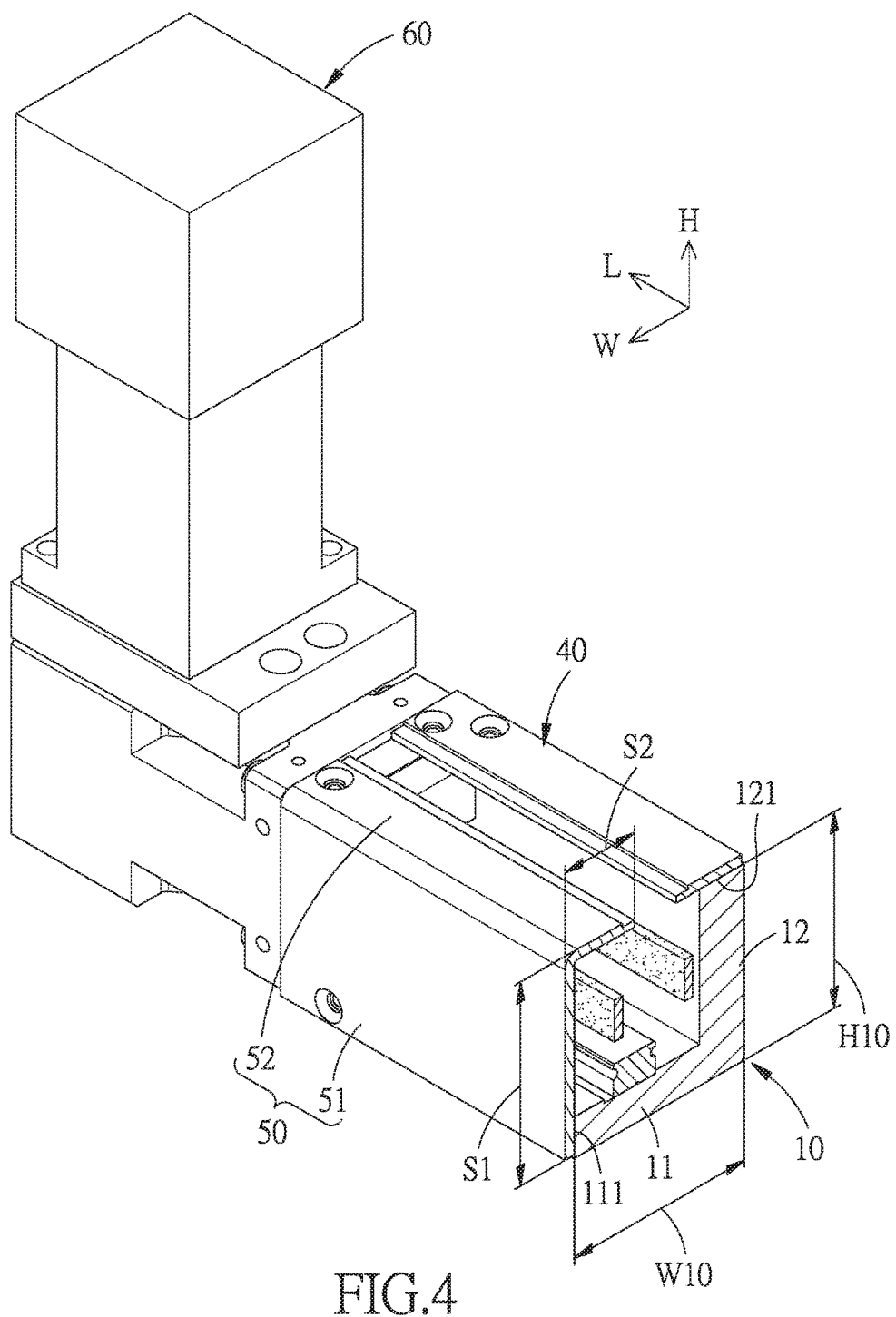
FIG. 4 is a cross sectional view of the belt driven linear actuator in accordance with the preferred embodiment of the present invention.
Figure 5:
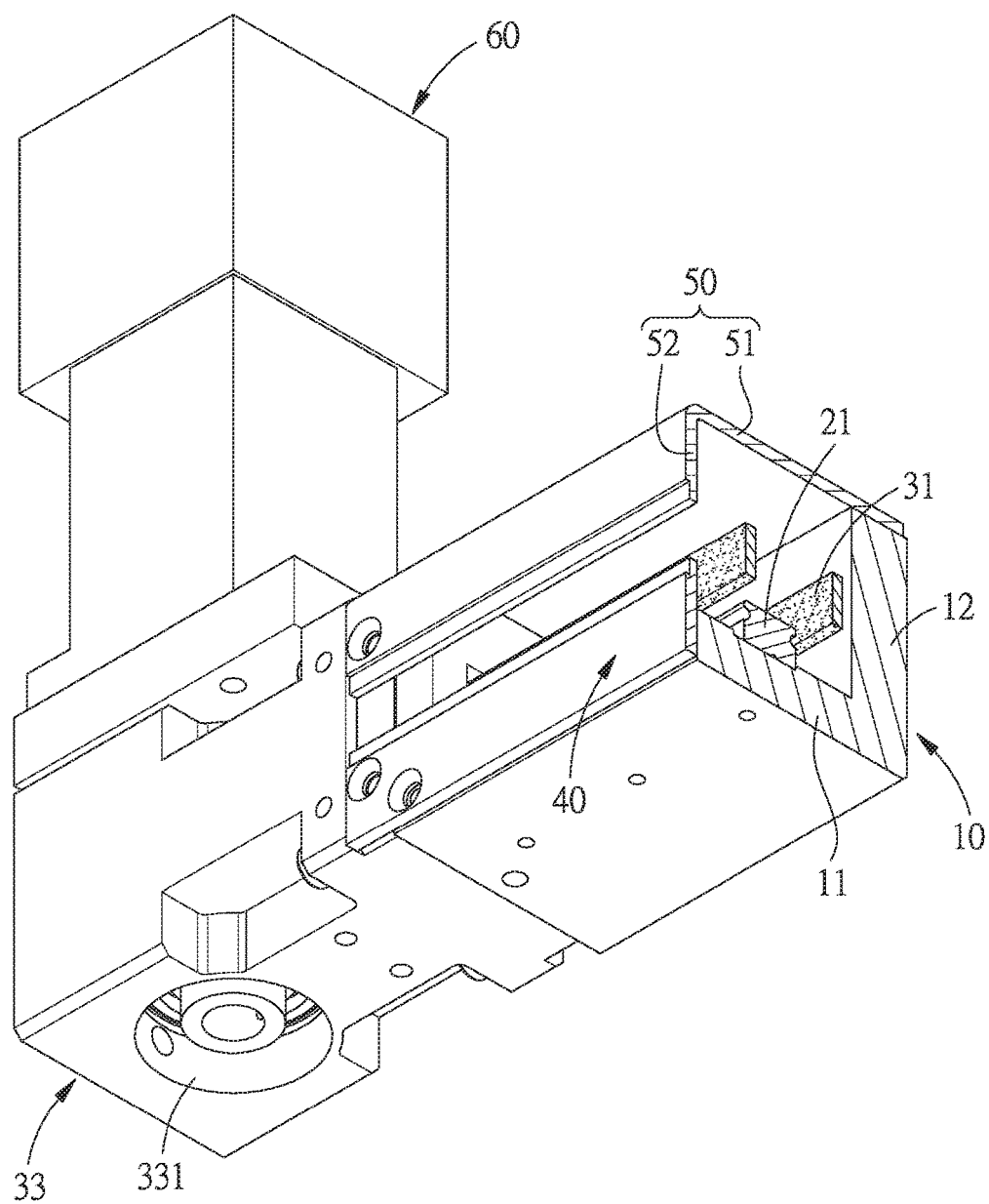
FIG. 5 shows that the drive source of the belt driven linear actuator in accordance with the preferred embodiment of the present invention is disposed in different directions.

It is to be noted that the key point is the advantages produced by the structure forms of the base 10. Since the base 10 is an L-shaped structure with the first assembling portion 11 and the second assembling portion 12, plus the first and second covers 40, 50 are removably disposed on the base 10, the present invention can be applied in different forms as follows:

Firstly, without changing the placement direction of the base 10, just changing the assembling positions of the first and second covers 40, 50 can change the direction of the gap P defined between the first and second covers 40, 50, which consequently changes the assembling direction of the slide block 70, and the assembling positions of the devices mounted on the slide block 70 as well. Therefore, the drive source 60 can be assembled in different directions, as shown in FIGS. 4 and 5.

Figure 6:
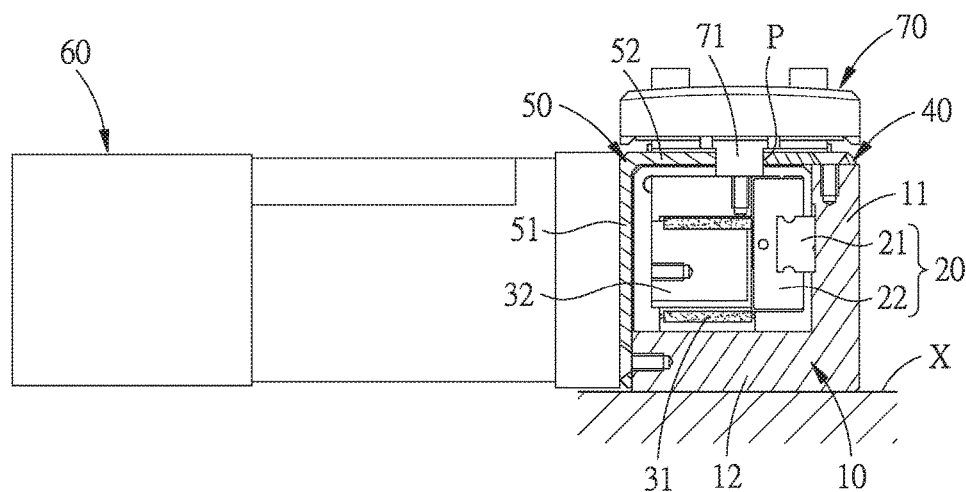
FIG. 6 is a first operational view of the belt driven linear actuator in accordance with the preferred embodiment of the present invention.
Figure 7:
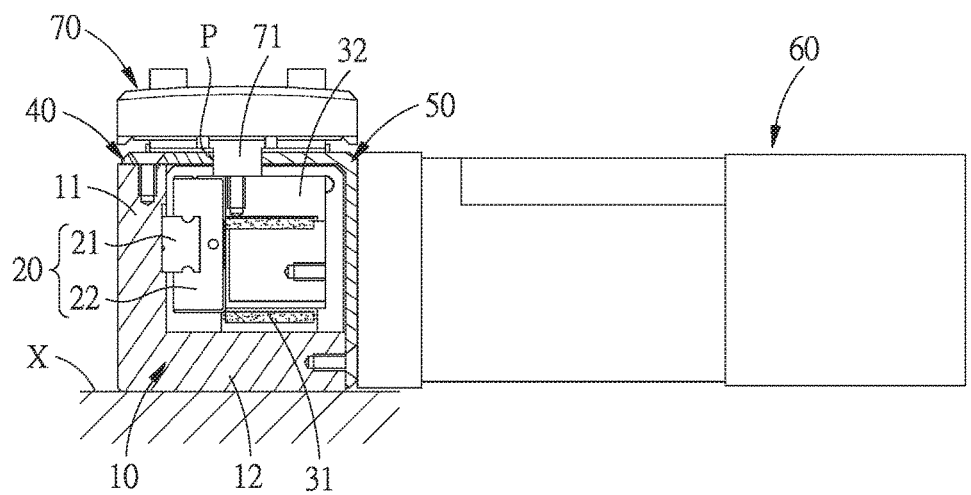
FIG. 7 is a second operational view of the belt driven linear actuator in accordance with the preferred embodiment of the present invention.
Figure 8:
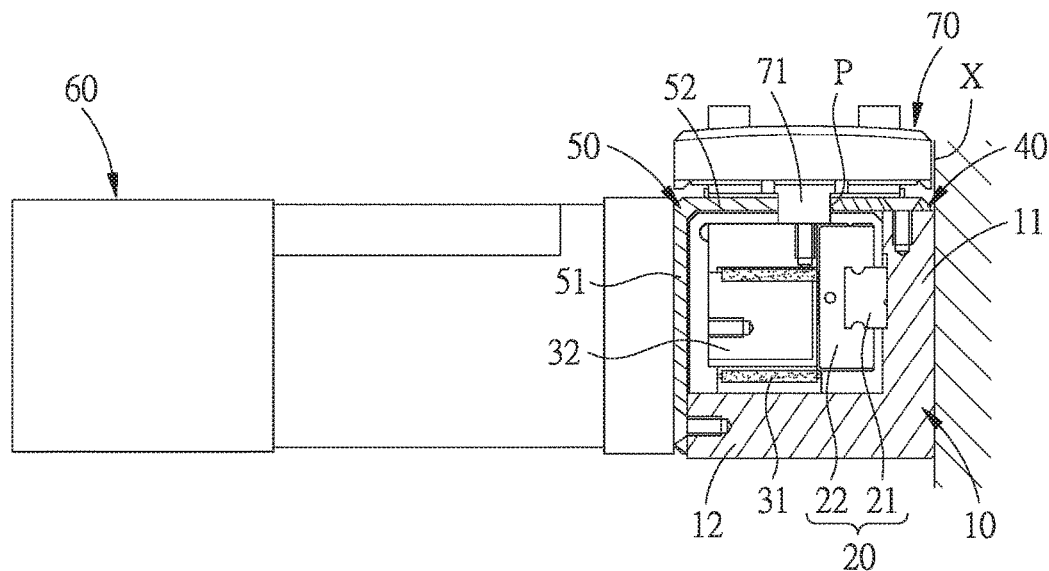
FIG. 8 is a third operational view of the belt driven linear actuator in accordance with the preferred embodiment of the present invention.
Figure 9:
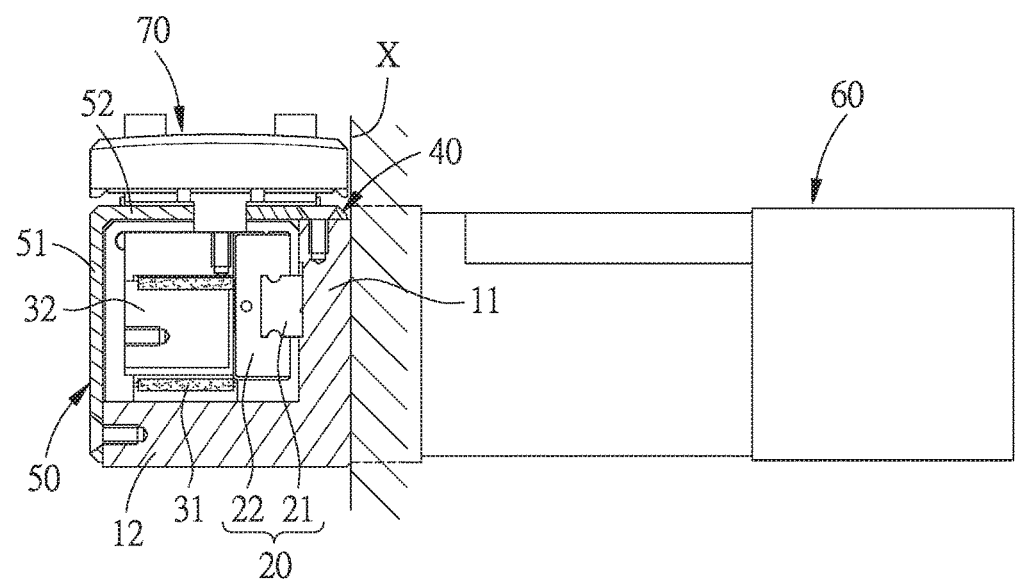
FIG. 9 is a fourth operational view of the belt driven linear actuator in accordance with the preferred embodiment of the present invention.
Figure 10:
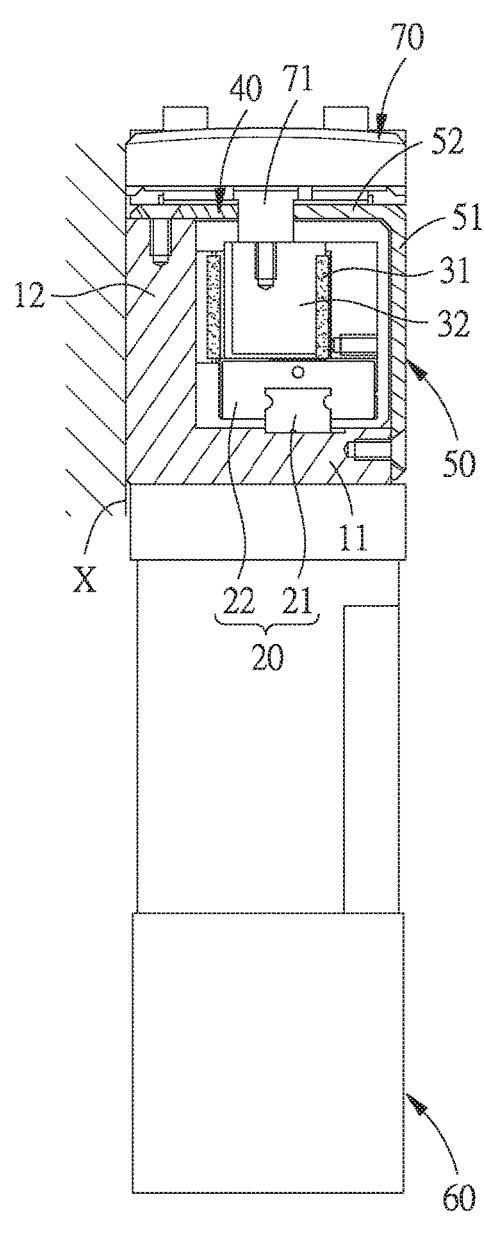
FIG. 10 is a fifth operational view of the belt driven linear actuator in accordance with the preferred embodiment of the present invention.
Figure 11:
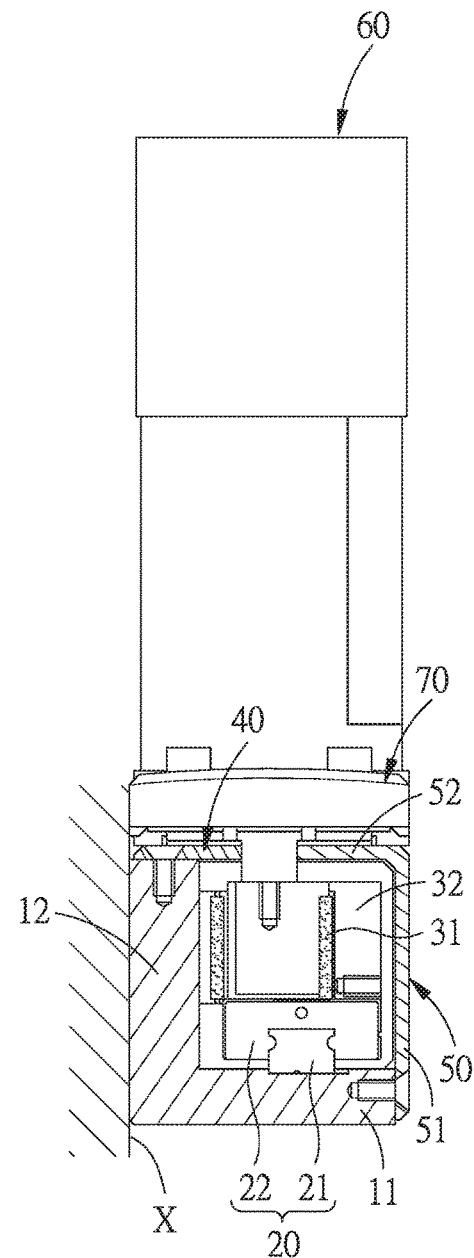
FIG. 11 is a sixth operational view of the belt driven linear actuator in accordance with the preferred embodiment of the present invention.
Figure 12:
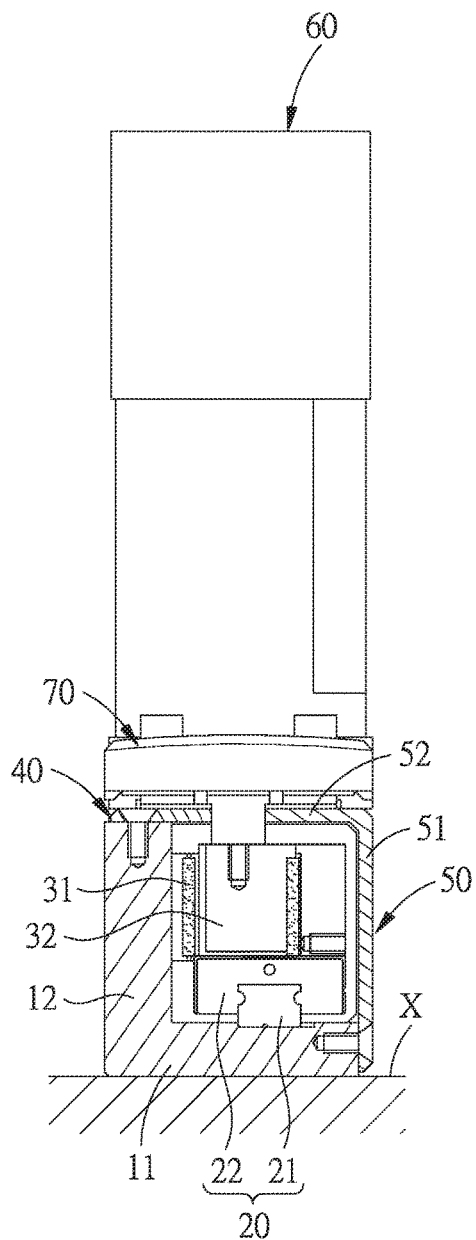
FIG. 12 is a seventh operational view of the belt driven linear actuator in accordance with the preferred embodiment of the present invention.
Figure 13:
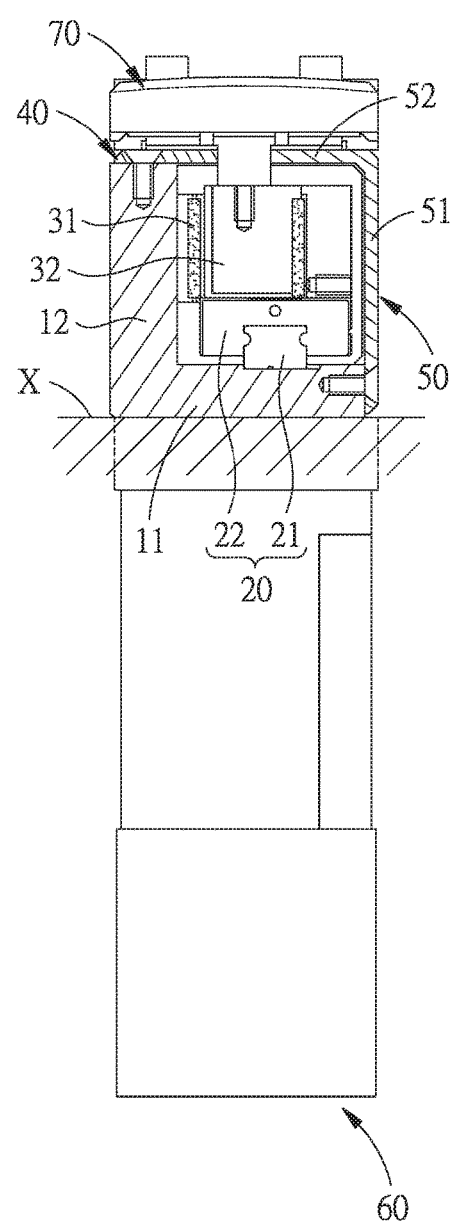
FIG. 13 is an eighth operational view of the belt driven linear actuator in accordance with the preferred embodiment of the present invention.

As shown in FIGS. 6 and 7, when the second assembling portion 12 is fixed to the same assembling surface X, just changing the direction of the base 10 can change the installation or assembling direction of the drive source 60. As shown in FIGS. 8 and 9, placing the first assembling portion 11 on different assembling surfaces X can also change the assembling direction of the drive source 60. As shown in FIGS. 10-13, the drive source 60 can also be changed in positions or directions through direction changes of the belt 31, the base 10, and the first and second covers 40, 50.

In summary, with the first and second covers removably disposed on the L-shaped base 10, plus the size restrictions on the abovementioned components, the first and second covers 40, 50 can be located at different positions to define different gaps P in different directions, so as to allow the slide block 70 to be assembled in different directions, and reduce the restriction on the assembling direction of the drive source 60. Besides, the base W10 of the base 10 is equal to the height H10 of the base 10, and the height S1 of the cover portion is equal to the height H10 and the width W10 of the base 10, which allows the base 10 to be assembled in the same position while in different directions, and thus the freedom in assembling positions and the applicability of the whole device of the present invention is enhanced.

While we have shown and described various embodiments in accordance with the present invention, it is clear to those skilled in the art that further embodiments may be made without departing from the scope of the present invention.

What is claimed is:

1. A belt driven linear actuator, comprising:
    a base with a first assembling portion and a second assembling portion which are connected to each other, wherein a direction connected between two ends of the base is defined as a length direction, the first assembling portion extends at least in the length direction and a width direction, the second assembling portion extends at least in the length direction and a height direction, the width direction is perpendicular to the length direction, the length direction is perpendicular to the width direction and the height direction, the base has a width (W10) in the width direction and a height (H10) in the height direction, (W10) is equal to (H10), an end surface of the first assembling portion which is not connected to the second assembling portion is defined as a first connecting end surface, and an end surface of the second assembling portion which is not connected to the first assembling portion is defined as a second connecting end surface;
    a linearly movable unit fixed between the first and second assembling portions and including a guide member and a linearly movable member linearly movable along the guide member;
    a belt drive unit driving the linearly movable member to move linearly;
    a first cover being a flat plate removably disposed on the base;
    a second cover being an L-shaped flat plate, wherein the first cover and the second cover are removably disposed on the first and second connecting end surfaces, respectively, the second cover including a cover portion and an assistant portion which are connected to each other, wherein the cover portion has a height which is measured from one end of the cover portion connected to the assistant portion to another opposite end of the cover portion, (S1)=(W10)=(H10), the cover portion being connected to the base, when the second cover is connected to the base, the assistant portion defines a gap with respect to the first cover;
    a drive source serving to rotate the belt driven unit; and
    a slide block being inserted in the gap and moved along with the linearly movable member.

2. The belt driven linear actuator as claimed in claim 1, wherein the belt drive unit includes a belt, an assembling seat and two pulley seats, the assembling seat is fixed to the linearly movable member, each of the two pulley seats includes an assembling hole running through both ends thereof, and a pulley rotatably disposed in the assembling hole, the two pulleys at located at two ends of the base, the belt is fixed to the assembling seat and wound around the pulleys of the two pulley seats, and the slide block has a connecting portion inserted in the gap and fixed to the assembling seat to move along with the linearly movable member.

3. The belt driven linear actuator as claimed in claim 2, wherein the drive source is connected to and rotates one of the pulleys.

4. The belt driven linear actuator as claimed in claim 1, wherein the guide member is in the form of a rail, and the linearly movable member is the form of a slide block which is linearly movable along the rail.

5. The belt driven linear actuator as claimed in claim 1, wherein the guide member is in the form of a rail, the linearly movable member is in the form of a roller seat which includes a seat body and a plurality of rollers, the rollers are rotatably clamped against two lateral sides of the seat body, so that the roller seat is linearly movable along the rail.

6. The belt driven linear actuator as claimed in claim 1, wherein the guide member is in the form of a rail with a spherical cross section, the linearly movable member is in the form of a slide block which includes a spherical engaging portion, the rail is movable inserted in the slide block, so that the slide block is linearly movable along the slide block.

* * * * *